United States Patent [19]
Vilard

[11] Patent Number: 5,500,690
[45] Date of Patent: Mar. 19, 1996

[54] TELEVISION APPARATUS PROVIDED WITH A DEVICE FOR SELECTING DIFFERENT SOURCES

[75] Inventor: Philippe Vilard, Houilles, France

[73] Assignee: U.S. Philips Corporation, New York, N.Y.

[21] Appl. No.: 314,561

[22] Filed: Sep. 28, 1994

[30] Foreign Application Priority Data

Sep. 29, 1993 [FR] France .................................... 93 11610

[51] Int. Cl.$^6$ .................................................. H04N 5/268
[52] U.S. Cl. .......................................... 348/706; 348/554
[58] Field of Search .................................... 348/705, 706, 348/553–557, 441, 443, 444, 449, 450, 453–455, 638, 642, 659, 663, 668, 725, 726, 727, 728, 731; 345/154; H04N 3/27, 5/268, 5/46

[56] References Cited

U.S. PATENT DOCUMENTS

| | | | |
|---|---|---|---|
| 2,886,632 | 3/1959 | Moore | 348/642 |
| 3,932,819 | 1/1976 | Spencer | 348/663 |
| 3,938,179 | 2/1976 | Amery | 348/441 |
| 4,660,073 | 4/1987 | Baumeister | 348/706 |
| 4,802,000 | 1/1989 | Willis | 348/554 |
| 4,935,807 | 6/1990 | Sendelweck | 348/554 |
| 4,963,979 | 10/1990 | Sendelweck | 348/554 |
| 5,032,900 | 7/1991 | Sendelweck | 348/554 |
| 5,081,522 | 1/1992 | Hiroyuki | 348/557 |
| 5,253,044 | 10/1993 | Lamy | 348/554 |
| 5,255,097 | 10/1993 | Spiero et al. | 348/554 |
| 5,438,375 | 8/1995 | Sasabe et al. | 348/554 |

*Primary Examiner*—James J. Groody
*Assistant Examiner*—Michael H. Lee
*Attorney, Agent, or Firm*—Bernard Franzblau

[57] ABSTRACT

A television apparatus includes a switching device for selecting different signal sources. In order to enable the supply of composite signals or "Y-C" signals at will to the input of one and the same circuit of the type having a "Y-C" input (two separate terminals), a filter eliminating the chrominance signal is arranged at the input "Y" and a filter eliminating the luminance signal is arranged at the input "C", whereas in a circuit of the type adapted to utilize a composite input signal, the input thereof is connected to a source for a signal of the type "Y" by means of a bridge comprising two series-arranged resistors, while the junction point of this bridge is connected to a source for a signal of the type "C" by means of a capacitive inductance resonance circuit of the series type which is tuned to the chrominance subcarrier frequency.

22 Claims, 2 Drawing Sheets

TELEVISION APPARATUS PROVIDED WITH A DEVICE FOR SELECTING DIFFERENT SOURCES

BACKGROUND OF THE INVENTION

1. Field of the Invention

This invention relates to a television apparatus provided with means for selecting a plurality of television signals available from different sources, certain signals of which are composite signals which are constituted by a mixture of a luminance signal and a chrominance signal, the latter being carried by a subcarrier, whereas other signals are "Y-C" signals in the form of a separate luminance signal and a separate chrominance signal, while at least one of the television apparatus circuits which is to receive one of these signals is adapted to utilize signals in the form of a separate luminance signal and a separate chrominance signal.

2. Description of the Related Art

When inputs of the two types are used, it is not *a priori* known which type of signal is being used at a given instant. The document U.S. Pat. No. 4,660,073 (Baumeister) describes the use of a detector which detects the received chrominance component so as to determine when the signal is of the Y-C type and to treat it as such, while the only circuit to receive the signals is of the type which treats the luminance and chrominance signals separately, and the composite signals are systematically converted into Y-C signals before they are applied to said circuit.

Nevertheless, it may occur that at least another one of the circuits of the television apparatus is adapted to utilize a composite signal. It would then be awkward to convert the composite signals when they are suitable to be directly applied to this other circuit.

SUMMARY OF THE INVENTION

To enable selection of any of the available signal sources and to use any type of circuit to which the signal is applied, the selection means according to the invention comprise a switching device having a plurality of inputs, viz. at least an input having an input terminal "Y" and an input terminal "C" for "Y-C" signals, and at least a further input having only one terminal for a composite signal, switches for selecting one of the inputs, and two separate outputs, one of which is referred to as the output "Y" and the other is referred to as the output "C", said switches being operated to connect the input terminal "Y" of the input of the "Y-C" type to the output "Y" of the switching device and to connect the input terminal "C" of the input of the "Y-C" type to the output "C" of the switching device when an input of the "Y-C" type must be selected, and to connect the further input simultaneously to the two outputs "Y" and "C" when an input of the composite type must be selected.

The circuit adapted to operate on the basis of the "Y-C" signals has then an input "C" and an input "Y" Advantageously, each of the inputs "Y" or "C" of this circuit is connected to the corresponding output "Y" or "C", respectively, of the switching device, while a filter eliminating the chrominance signal is arranged at the input "Y" of the circuit and a filter eliminating the luminance signal is arranged at the input "C" of the circuit.

This enables the circuit to function also when it is connected to a source of the composite type instead of to a source of the "Y-C" type for which it is conceived.

The input of the circuit adapted to operate on the basis of a composite signal is advantageously connected to the output "Y" of the switching device by means of a filter rejecting the chrominance subcarrier frequency, and to the output "C" of the switching device by means of a bandpass filter centered at the chrominance subcarrier frequency.

It is thereby achieved that, without switching, the level of the signal is not doubled with respect to a source of the "Y-C" type when the circuit is connected to a source of the composite type.

To realize the rejection filter together with the bandpass filter in the most economical manner, the sources connected to the inputs of the switching device being sources having a low output impedance and the input of the circuit having a high impedance, said input is connected to the output "Y" of the switching device by means of a bridge comprising two series-arranged resistors, while the junction point of this bridge is connected to the output "C" of the switching device by means of a capacitance-inductance resonance circuit of the series type which is tuned to the chrominance subcarrier frequency.

These and other aspects of the invention will be apparent from and elucidated with reference to the embodiment described hereinafter.

DESCRIPTION OF THE PREFERRED EMBODIMENT

Figure 1:
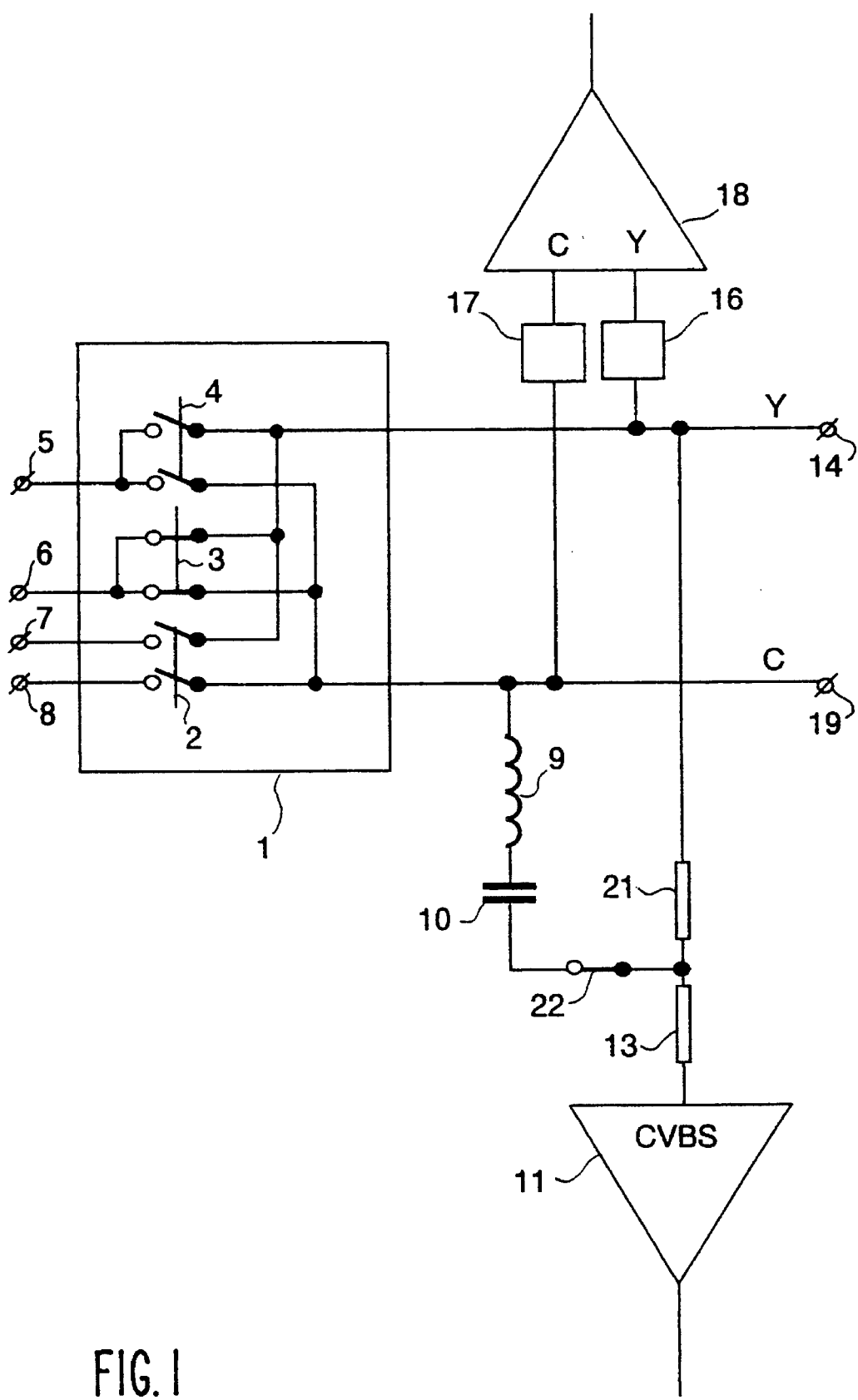
FIG. 1 is a diagram of the parts of a television apparatus relevant to the invention.

A signal of the composite type, also referred to as "CVBS" (Composite Video Basic Signal) comprises a set of two mixed signals: a luminance signal referred to as "Y" and a chrominance signal referred to as "C", the signal "Y" being in the baseband and the signal "C" being carried by a subcarrier, for example, at 4.434 MHz in the case of a PAL standard.

The separate luminance and chrominance information components, generally referred to as "Y-C", comprise a luminance signal referred to as "Y" and a chrominance signal referred to as "C" which are identical to those of a composite signal but are separated from each other.

In a television apparatus, information components of the composite type are available, for example at the output of the appropriate SECAM or PAL demodulator of the television apparatus and also at the video inputs of the as for "SCART" input-output socket or for peripheral equipment. On the other hand, signals of the "Y-C" type are available at an input for connection to a video recorder of the S-VHS type or Hi-8 type, or at the output of a demodulator of the "D2-MAC/PACKET" type.

An integrated circuit intended to introduce a "a picture-in-picture" has an input of the composite type for receiving the picture to be embedded, while the principal video circuit supplying the principal television picture is adapted to utilize "Y-C" signals. Thus, there are four cases:

First case: the circuit adapted to operate on the basis of a composite signal receives "Y-C" signals;

Second case: the circuit adapted to operate on the basis of a composite signal receives a signal of just this type;

Third case: the circuit adapted to operate on the basis of the "Y-C" signals receives a signal of just this type;

Fourth case: the circuit adapted to operate on the basis of the "Y-C" signals receives a composite signal.

To enable selection of any of the available signal sources, the switching device 1 shown in the sole Figure has two outputs 14 and 19, the output 14 referred to as "Y" and, in principle, intended to carry a luminance signal, the output 19 referred to as "C" and, in principle, intended to carry a chrominance signal, two inputs 5 and 6, each for a composite signal, an input (7, 8) having an input terminal 7 for a luminance signal and an input terminal 8 for a chrominance signal, three double switches 2, 3, 4.

It will be evident that the respective number of inputs of each type may be different.

When the contacts of the switch 2 are closed, the luminance signal input 7 is connected to the luminance signal output 14 and the chrominance signal input 8 is connected to the chrominance signal output 19. When the selected input is of the type supplying separate luminance and chrominance information components, the switches apply the luminance information components to the corresponding output and the chrominance information components to the other output.

When the contacts of the switch 3 are closed, which is the case in the Figure, the composite signal input 6 is connected to both the output 14 and the output 19. Similarly, when the contacts of the switch 4 are closed, the composite signal input 5 is connected to both the output 14 and the output 19. When the selected input is of the composite type, the switches simultaneously connect this input to the two outputs.

When a circuit is connected to the output of the switching device, it is not *a priori* known to which type of input it will be connected.

When a circuit 18 is used, which is adapted to operate on the basis of separate chrominance and luminance information components, it would be normal to connect its "C" input to the "C" output of the switching device and its "Y" input to the "Y" output of the device. However, for the fourth case as described hereinbefore, where an input of the composite type is selected, a filter 16 eliminating the "C" component is arranged at the "Y" input and a filter 17 eliminating the "Y" component is arranged at the "C" input. Nevertheless, no switching is necessary to adapt the circuit accordingly, as the filters 16 and 17 can be arranged permanently because they do not have any detrimental influence on the operation in the third case, in which case they serve no purpose.

If a circuit 11 is used which is adapted to operate on the basis of a composite signal and if the first case as described hereinbefore is used, in which an input having separate chrominance and luminance information components is selected, it would be normal to connect its input to the device via an adder circuit, for example, a resistance bridge so as to produce the sum of the signals at the "Y" output and at the "C" output of the switching device 1. Such an assembly can function because the signal "C" in the "Y-C" signals is identical to the chrominance signal of a composite signal, the only difference being that it is carried by a separate conductor.

However, then there is a problem concerning the signal level if this adder remains in place in the second case. By adding a signal "Y" of unity level and a signal "C" of unity level in the first case, a composite signal of unity level is obtained. On the other hand, by adding a composite signal of unity level to the same composite signal of unity level in the second case, a composite signal of the double level is obtained.

It would thus be necessary to install a switching facility for adapting the circuit in accordance with either the first or the second case. This requirement is avoided because, the sources connected to the inputs 5–8 of the switching device being sources having a low output impedance when the input of the circuit 11 has a high impedance, said input of the circuit 11 is connected to the output "Y" (14) of the device 1 by means of a bridge comprising two series-arranged resistors 21, 13 and the junction point of this resistance bridge is connected to the output "C" (19) of the above-mentioned device by means of a series LC circuit constituted by a self-inductance 9 and a capacitance 10, which LC circuit is tuned to the chrominance subcarrier frequency.

Consequently, in the first case the "C" component can traverse the series LC circuit as if nothing had happened and the "Y" component is no longer attenuated, but in the second case the "Y" component of the composite signal arriving at the output "C" of the device is obstructed by the series LC circuit while the "C" component of the same composite signal arriving at the output "Y" of the device is short-circuited by the same series LC circuit. Thus, the level at the input of the circuit used is the same as in the first case.

Such a filtering system operates in a satisfactory manner with resistors 21 and 13 having a value of, for example, 220 Ohms, while the capacitance 10 has a value of 130 pF and the self-inductance 9 has a value of 10 μH. As an alternative, the resistor 21 could be replaced by a filter (21) which rejects the chrominance subcarrier frequency.

To simplify the Figure, two circuits 11 and 18 are shown which are connected to the same switching device 1, but it will be evident that in general each circuit will have its own switching device.

Figure 2:
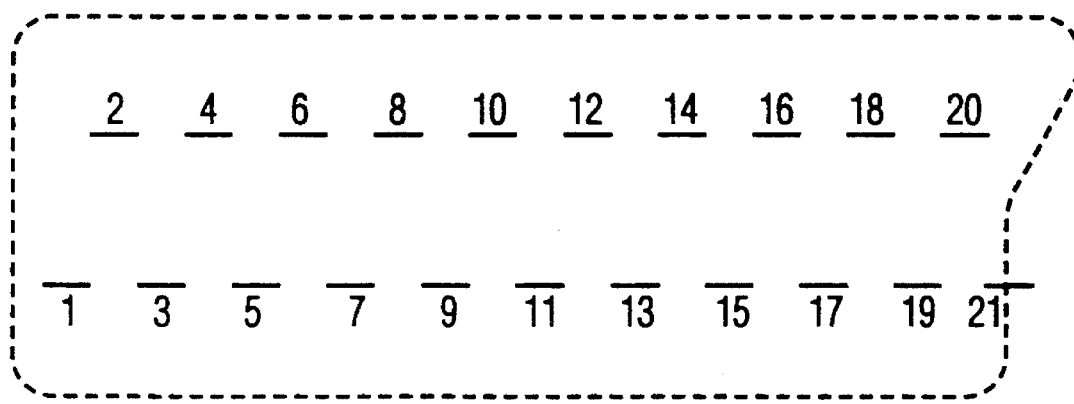
FIG. 2 shows a SCART input-output socket.

There may be a particular situation when one and the same video input for peripheral equipment is used for two applications and when the one or the other of the two signal types is unpredictably received, dependent on the apparatus connected by a user. Then it is not possible to classify the input according to "composite" or "Y-C" type. When, for example, the video input for peripheral equipment is of the European standardized type referred to as "SCART" (see FIG. 2) and is extended to the use of an S-VHS signal or a Hi-8 signal, a customary composite signal may be applied to its pin no. 20, but an S-VHS signal may also be available, whose luminance component is then applied to pin no. 20 and whose chrominance component is applied to, for example pin no. 15 (normally provided for the input of a "red" component), while a signal is also applied to the "intercommunication" pin no. 12 of the video input for peripheral equipment so as to signal the situation. In this case, pin no. 20 of the video input for peripheral equipment must be connected to the terminal 7 (i.e. to the output 14 when the switch 2 is closed) and pin no. 15 of the video input for peripheral equipment must be connected to the terminal 8 (i.e. to the output 19 when the switch 2 is closed). When the signal is a composite signal, it is only present at the terminal 14 and not at the terminal 19 and the chrominance component of this composite signal present at the terminal 14 is short-circuited by the filtering system 9, 10, 21. For this particular case a switch 22 is provided which is only opened in the "Y-C" case which is signaled by a signal applied to pin no. 12. A known circuit detects the presence of such a signal in order to control the switch 22 without the user's intervention.

I claim:

1. A television apparatus comprising: means for selecting a plurality of television signals available from different signal sources, certain signals of which are composite signals which comprise a mixture of a luminance signal and a chrominance signal carried by a subcarrier, whereas other signals are "Y-C" signals in the form of a separate luminance signal and a separate chrominance signal, while at least one of the television apparatus circuits which is to receive one of these signals is adapted to utilize signals in the form of a separate luminance signal and a separate chrominance signal, at least a further one of the television apparatus circuits being adapted to utilize a composite signal, wherein the selection means comprise a switching device comprising;

a plurality of inputs including at least an input having an input terminal "Y" and an input terminal "C" for "Y-C" type signals, and at least a further input having only one terminal for the composite signal, switches for selecting one of the inputs, and two separate outputs, one an output "Y" and the other an output "C", said switches being operated to connect the input terminal "Y" to the output "Y" of the switching device and to connect the input terminal "C" to the output "C" of the switching device when an input of the "Y-C" type is selected, and to connect said further input simultaneously to the two outputs "Y" and "C" when an input of the composite type is selected.

2. A television apparatus as claimed in claim 1, wherein the one circuit adapted to operate on the basis of the "Y-C" signals has an input "C" and an input "Y" connected to the corresponding output "C" and "Y", respectively, of the switching device via a filter eliminating the chrominance signal arranged at the input "Y" of the one circuit and via a filter eliminating the luminance signal arranged at the input "C" of the one circuit.

3. A television apparatus as claimed in claim 1, wherein an input of the further circuit adapted to operate on the basis of a composite signal is connected to the output "Y" of the switching device by means of a filter-rejecting the chrominance subcarrier frequency and to the output "C" of the switching device by means of a bandpass filter centred at the chrominance subcarrier frequency.

4. A television apparatus as claimed in claim 3, wherein, the sources connected to the inputs of the switching device comprise signal sources having a low output impedance and the input of the further circuit has a high impedance, said input is connected to the output "Y" of the switching device by means of a bridge comprising two series-arranged resistors, while a junction point of said bridge is connected to the output "C" of the switching device by means of a series type capacitance-inductance resonance circuit tuned to the chrominance subcarrier frequency.

5. A television apparatus as claimed in claim 4, in which, in accordance with apparatus which a user has connected, a video input-output socket may receive one or the other of the two types of signals, sometimes a signal of the composite type which is applied to a pin of the video input-output socket normally intended for the input of a composite signal, sometimes "Y-C" signals whose luminance signal is also applied to said pin which is normally intended for the input of a composite signal, while the chrominance signal is applied to another pin of the video input-output socket, and a control signal is applied to an intercommunication pin of the video input-output socket so as to signal the situation, wherein, said pin which is normally intended for the input of a composite signal is connected to a terminal "Y" of an input of the "Y-C" type of the switching device and said other pin is connected to the terminal "C", in that a switch is connected in series with the capacitance-inductance resonance circuit of the series type, and means for opening said switch only when said control signal is present at the intercommunication pin.

6. A television apparatus as claimed in claim 2, wherein input of the further circuit adapted to utilize a composite signal is connected to the output "Y" of the switching device by means of a filter rejecting the chrominance subcarrier frequency and to the output "C" of the switching device by means of a bandpass filter centered at the chrominance subcarrier frequency.

7. A television apparatus as claimed in claim 6, wherein, the signal sources connected to the inputs of the switching device comprise signal sources having a low output impedance and the input of the further circuit has a high impedance, said input of the further circuit is connected to the output "Y" of the switching device by means of a bridge comprising two series-arranged resistors, while a junction point of the bridge is connected to the output "C" of the switching device by means of a series type capacitance-inductance resonance circuit of the series type which is tuned to the chrominance subcarrier frequency.

8. A television apparatus as claimed in claim 7, in which, in accordance with apparatus which a user has connected, a video input-output socket may receive one or the other of the two types of signals, sometimes a signal of the composite type which is applied to a pin of the video input-output socket normally intended for the input of a composite signal, sometimes "Y-C" signals whose luminance signal is also applied to said pin which is normally intended for the input of a composite signal, while the chrominance signal is applied to another pin of the video input-output socket, and a control signal is applied to an intercommunication pin of the video input-output socket so as to signal the situation, wherein, said pin which is normally intended for the input of a composite signal is connected to a terminal "Y" of an input of the "Y-C" type of the switching device and said other pin is connected to the terminal "C", in that a switch is connected in series with the capacitance-inductance resonance circuit of the series type, and means for opening said switch only when said control signal is present at the intercommunication pin.

9. The television apparatus as claimed in claim 1 wherein an input of the further circuit adapted to utilize the composite signal is coupled to the "Y" output of the switching device and is coupled to the "C" output thereof via a series LC resonant circuit tuned to the chrominance subcarrier frequency.

10. A television apparatus comprising:

a first input for supplying a composite color video signal including a luminance signal component and a chrominance signal component, a Y input terminal for supplying a separate luminance signal, a C input terminal for supplying a separate chrominance signal, a first circuit of the television apparatus which is adapted to utilize said separate luminance signal and said separate chrominance signal and having a Y input and a C input, a second circuit of the television apparatus which is adapted to utilize the composite video signal, a switching device having a Y output and a C output and switching means coupled between said first input, said Y input, said C input and said Y output and said C output of the switching device, said switching means being operated so as to couple the Y input terminal to said Y output and to couple the C input terminal to said C output when separate Y and C input signals are to be selected and to couple said first input to each of said Y output and said C output when an input composite video signal is to be selected, and means coupling said Y output and said C output to said Y input and said C input, respectively, of said first circuit, and to an input of the second circuit.

11. The television apparatus as claimed in claim 10 wherein, to select an input composite video signal, the switching means comprise first and second switches operated in synchronism for simultaneously coupling said first input to said Y output and to said C output, respectively, of the switching device.

12. The television apparatus as claimed in claim 11 wherein, to select separate Y and C input signals, the switching means further comprise third and fourth switches operated in synchronism for simultaneously coupling said Y input terminal and said C input terminal to said Y output and to said C output, respectively, of the switching device.

13. The television apparatus as claimed in claim 10 wherein the coupling means comprise a chrominance signal rejection filter and a luminance signal rejection filter coupled between said Y input and said C input of the first circuit and said Y output and said C output, respectively, of the switching device.

14. The television apparatus as claimed in claim 13 wherein said coupling means further comprise a circuit path coupling the input of the second circuit to said Y output of the switching device and to said C output of the switching device via a series LC resonant circuit and a part of said circuit path.

15. The television apparatus as claimed in claim 14 wherein said Y output and said C output of the switching device are the only outputs thereof and said LC resonant circuit is tuned to the chrominance subcarrier frequency.

16. The television apparatus as claimed in claim 10 wherein said coupling means comprise first and second resistors connected in series circuit between the input of the second circuit and the Y output of the switching device and a series LC resonant circuit coupled between said C output of the switching device and a junction point between said first and second resistors.

17. The television apparatus as claimed in claim 16 wherein said coupling means further comprise a chrominance signal rejection filter and a luminance signal rejection filter coupled between said Y input and said C input of the first circuit and said Y output and said C output, respectively, of the switching device.

18. A television apparatus comprising:

a first input for supplying a composite color video signal including a luminance single component and a chrominance signal component, a Y input terminal for supplying a separate luminance signal, a C input terminal for supplying a separate chrominance signal, wherein said TV apparatus includes a circuit adapted to utilize the composite video signal, a switching device having a Y output and a C output and switching means coupled between said first input, said Y input, said C input and said Y output and said C output of the switching device, said switching means being operated so as to couple the Y input terminal to said Y output and to couple the C input terminal to said C output when separate Y and C input signals are to be selected and to couple said first input to each of said Y output and said C output when an input composite signal is to be selected, and means coupling said Y output and said C output to an input of said circuit.

19. The television apparatus as claimed in claim 18 wherein said coupling means comprise first and second resistors connected in series circuit between the input of the circuit and the Y output of the switching device and a series LC resonant circuit coupled between said C output of the switching device and a junction point between said first and second resistors.

20. The television apparatus as claimed in claim 2 wherein each of said filters is permanently and directly connected between its respective input of the one circuit and the corresponding output of the switching device.

21. The television apparatus as claimed in claim 18 wherein said input of the circuit is connected to said Y output via a reactance-free circuit path.

22. A television apparatus including means for selecting a plurality of television signals available from different signal sources, one of which is a composite signal including a luminance component and a chrominance component, whereas at least one other signal source comprises Y-C signals in the form of separate luminance and chrominance signals, wherein a first circuit in the television apparatus is adapted to process Y-C signals and has a Y input terminal and a C input terminal, the means for selecting comprising:

a Y-C input having a terminal Y and a terminal C for Y-C signals, a further input having only one terminal for a composite signal, switches for selecting the different inputs, wherein a second circuit in the television apparatus is adapted to directly process composite signals, said means for selecting further comprise:

two outputs, an output Y and an output C, to which are equally connected the first circuit and the second circuit, switches for connecting the terminal Y of the Y-C input to the output Y and the input terminal C of the Y-C input to the output C when an input of the Y-C type is selected, and switches for connecting simultaneously the one terminal of the further input directly to the two outputs Y and C together when a composite input signal is selected.

* * * * *